United States Patent [19]

Furlong

[11] Patent Number: 4,525,947

[45] Date of Patent: Jul. 2, 1985

[54] METHOD AND APPARATUS FOR UNWRAPPING A PLURALITY OF SHORT LINES FROM A LONGLINE

[75] Inventor: Donn B. Furlong, Snohomish, Wash.

[73] Assignee: Marine Construction & Design Co., Seattle, Wash.

[21] Appl. No.: 619,204

[22] Filed: Jun. 11, 1984

[51] Int. Cl.$^3$ ............................................. A01K 97/00
[52] U.S. Cl. ........................................... 43/4; 43/4.5; 43/27.4
[58] Field of Search .............................. 43/4, 4.5, 27.4

[56] References Cited

U.S. PATENT DOCUMENTS

| Re. 28,380 | 4/1975 | Tison | 43/6.5 |
| 3,377,733 | 4/1968 | Godo | 43/4 |
| 4,107,865 | 8/1978 | Alex | 43/27.4 |
| 4,250,648 | 2/1981 | Jacobsen | 43/4 |

FOREIGN PATENT DOCUMENTS

| 595030 | 3/1960 | Canada . |
| 511151 | 3/1920 | France . |
| 127086 | 8/1973 | Norway . |

*Primary Examiner*—Nicholas P. Godici
*Assistant Examiner*—M. Jordan
*Attorney, Agent, or Firm*—Christensen, O'Connor, Johnson & Kindness

[57] ABSTRACT

Method or apparatus for unwinding gangions from a longline fishing line by first wrapping all of the gangions in a first direction about the longline and thereafter unwrapping them to leave them relatively free from the longline. Wrapping and unwrapping can be accomplished by running the longline through a series of hollow cylinders having permanent magnets mounted on the interior surface. The cylinders are rotated in opposite directions. As the gangions enter the first of the cylinders, the hooks are attracted to the magnets in the rotating cylinders and are rotated about the longline so as to wind all of the gangions in a common direction. Thereafter, the hooks are attracted to the magnets in the second cylinder, which is rotating in the opposite direction, thereby unwinding the gangions. In this manner, regardless of the original wrap of the gangions about the longline, each can be completely unwrapped and left dangling from the longline.

12 Claims, 12 Drawing Figures

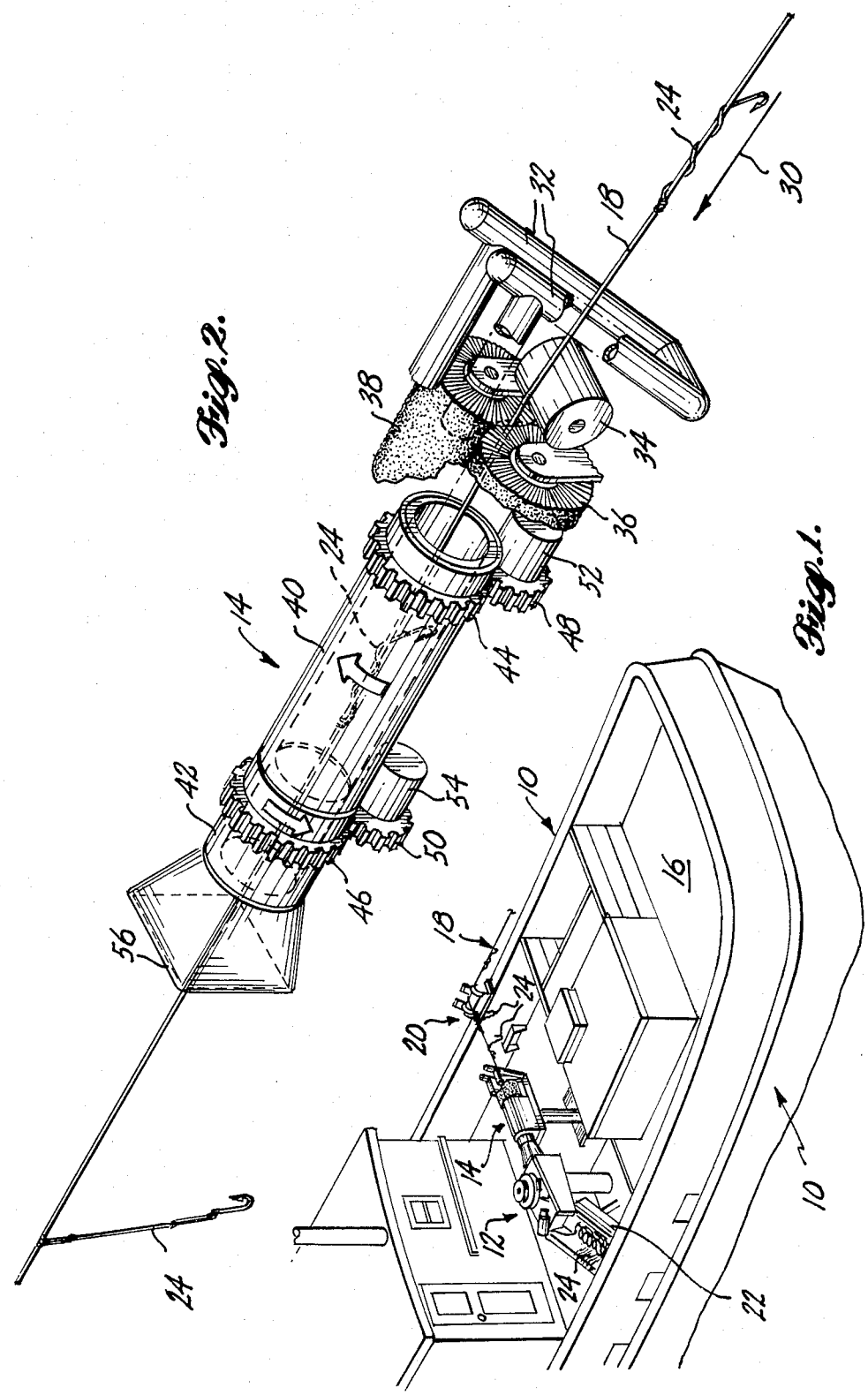

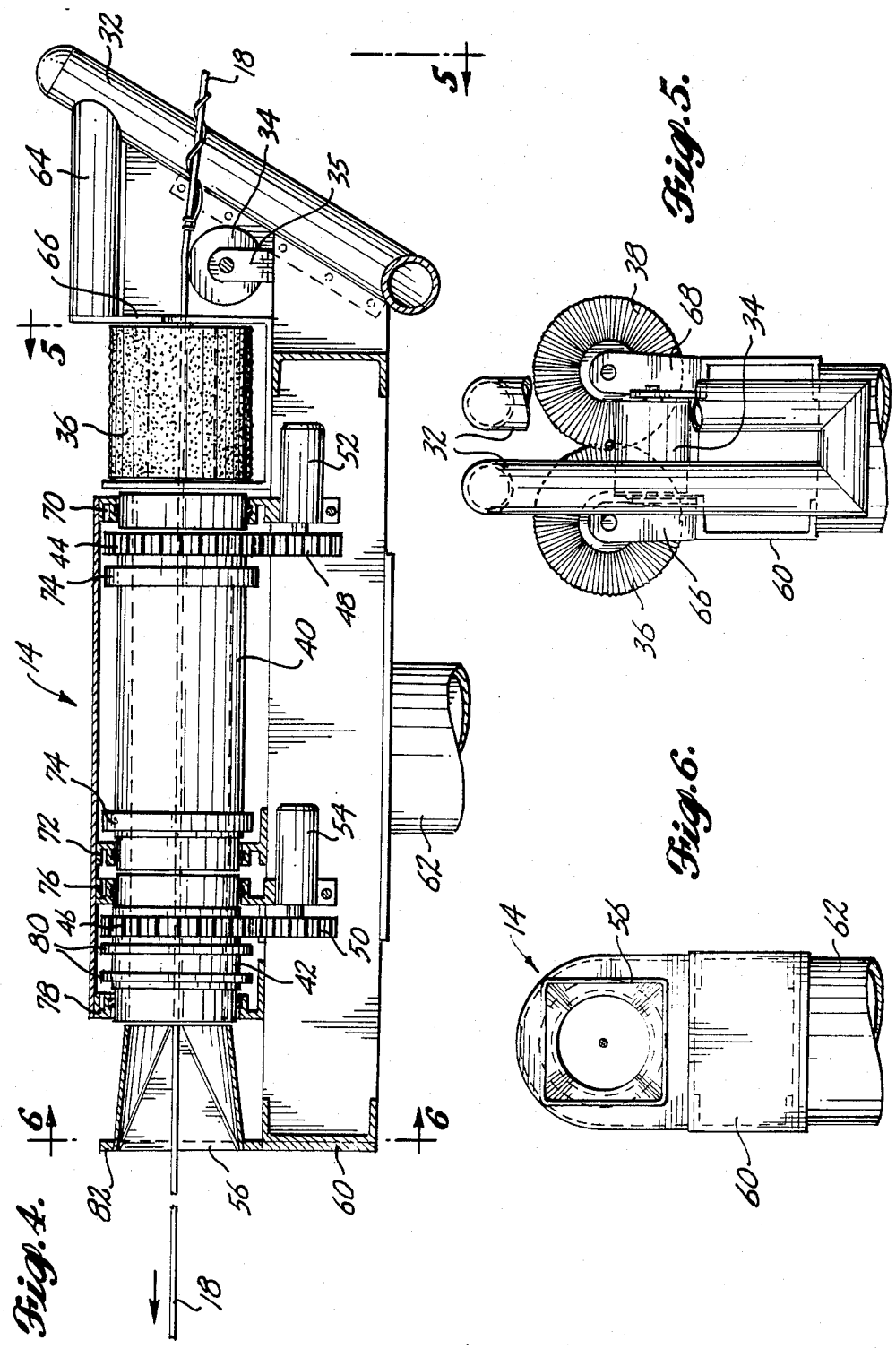

METHOD AND APPARATUS FOR UNWRAPPING A PLURALITY OF SHORT LINES FROM A LONGLINE

BACKGROUND OF THE INVENTION

The present invention relates to a method and apparatus for unwinding a plurality of short lines from a longline, and more particularly for unwrapping gangions from a longline fishing line so that the gangions are suspended relatively free from the line.

A substantial number of fishing fleets throughout the world utilize the longline method of fishing for commercially harvesting fish from the ocean. To fish using the longline method, a plurality of hook-tipped short lines, or gangions, are affixed at spaced locations to a ground line having a length of 1500 feet (500 meters) or more. The gangions vary in length from longline to longline from approximately 10 inches (25 centimeters) to 20 inches or more (50 centimeters or greater). One end of the longline is then weighted. The hooks on the gangions are sequentially baited and the longline dropped overboard. The longline is left out until a sufficient number of fish have been hooked. The long line is then hauled back on to the boat, the fish removed, and the longline and gangions stored awaiting the next fishing cycle. Conventionally, the longlines are stored in a tub or box in a partially coiled fashion with the gangions wound around the ground line.

In the past, the gangions have been unwrapped from ground lines by hand in preparation for storage or baiting. Heretofore, mechanical apparatus have also been suggested for automating the unwrapping procedure. These devices, however, have been sufficiently impractical or unwieldy to gain any acceptance in the fishing industry. Examples of such apparatus include those disclosed in U.S. Pat. No. 3,377,733 to Godo. Godo discloses a device for first sensing the number of times a gangion is wrapped around a ground line and a mechanical device for thereafter unwrapping the gangion from the ground line. The Godo system, while apparently effective, is relatively expensive to implement. It requires sensitive electronic sensing circuitry and that can be difficult to repair and maintain should it break down. Another such mechanical device is the gangion unwrapping device disclosed in Norwegian Pat. No. 127,086 to Vartdal. Vartdal discloses a hollow cylinder carrying a plurality of magnets through which the longline is run. The hollow cylinder is rotated as the longline, gangion and hook pass through the hollow cylinder. Because the steel hook is attracted to the magnets, the rotation of the cylinder and thus the magnets about the longline cause the hook to be rotated about the longline, thereby unwrapping the gangions. While the disclosure of the Vartdal patent is very generalized, it assumes that the gangions are wrapped about the longline in a common direction. In practice, of course, this is not true. Thus, in order to effectively use the Vartdal device, one would have to utilize a Godo-like wrap direction sensor and then change the direction of rotation of the Vartdal cylinder in order to unwrap all gangions from the longline regardless of the direction in which they are wrapped.

SUMMARY OF THE INVENTION

The present invention provides a method and apparatus for unwrapping gangions from longlines without sensing the direction of wrap of the gangion about the longline and without regard to the number of times the gangion is wrapped about the longline. The essence of the applicant's invention is to first wrap all of the gangions about the longline in the same direction with substantially the same number of turns, and thereafter to unwrap the gangion from the longline by rotating the hook about the longline a number of times substantially equal to the number of times it was wrapped around the line. In its broadest sense, this invention provides a method of forwarding the longline along a relatively straight, unwinding path sequentially past a wrapping station and an unwrapping station. As a gangion passes the wrapping station, the free end of the gangion is controllably grasped and wrapped about the longline in a first direction, regardless of the initial direction of wrap of the gangion. The gangion then leaves the wrapping station and enters the unwrapping station where the free end of the gangion is again controllably grasped and moved about the longline in a second direction opposite to the first. In its preferred form, the speed of wrapping at the first wrapping station is sufficiently high relative to the linear speed of the longline through the wrapping station so as to unwrap any gangions that are wrapped about the longline in a direction opposite to the first direction and to rewrap them in the first direction. Any gangions that are already wrapped in the first direction are unaffected. Similarly any gangions that are partially wrapped in the first direction or the opposite direction are also rewrapped. When the gangions pass through the unwrapping station, the gangions are unwrapped in a second direction opposite to the first direction. The unwrapping speed is chosen so as to rotate the free end of the gangion about the longline a preselected number of times equivalent to the average number of times gangions are wrapped about the longline at the wrapping station. In actual practice, utilizing the method and apparatus of the present invention, the gangions are sufficiently unwrapped so that, in general, there are no wraps, or perhaps only one wrap, about the longline after the gangions leave the unwrapping station.

BRIEF DESCRIPTION OF THE DRAWINGS

A better understanding of the present invention can be derived by reading the ensuing specification in conjunction with the accompanying drawings wherein:

FIG. 1 is a view of the stern and afterdeck of a fishing boat on which the gangion unwinder of the present invention has been installed;

FIG. 2 is a semi-schematic, isometric view of the gangion unwinder of the present invention;

FIG. 4 is a longitudinal view of the gangion unwinder of the present invention;

FIG. 5 is a partial sectional view of the gangion unwinder of the present invention taken along staggered section line 5—5 of FIG. 4;

FIG. 6 is a partial sectional view of the gangion unwinder taken along section line 6—6 of FIG. 4;

DETAILED DESCRIPTION OF THE INVENTION

Figure 3A:
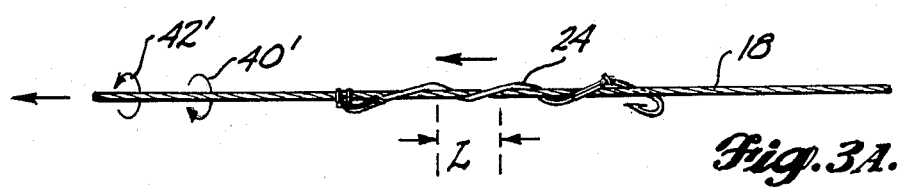
FIGS. 3A through 3D show gangions in various state of wind about a longline.

Referring now to FIG. 1, a typical, conventional fishing boat 10 is illustrated with a longline hauler-coiler 12, and a gangion unwinder 14 constructed in accordance with the present invention mounted on the deck 16 of the fishing boat 10. A longline 18 is illustrated being pulled over a bulwark roller 20 mounted on the bulwark of the fishing boat 10. The longline is being drawn through the gangion unwinder 14 by the hauler-coiler 12 and then deposited in a storage tub 22. The gangions 24, regardless of their degree of initial wrap about the longline and regardless of the direction of wrap about the longline 18, are unwound from the longline as they pass through the gangion unwinder 14. The hauler-coiler then coils the longline 18 in the storage tub 22 while sequentially placing the hooks at the end of the gangions 24 on a rail forming one side of the storage tub 22. When the longline is completely drawn into the boat, the tub can be replaced by an empty tub, readying it for hauling in another longline.

Referring now to FIG. 2, the unwinder 14 is illustrated in a partially schematic, isometric view to highlight its major components. The longline 18 with wound gangions 24 travel through the unwinder 14 in the direction of arrow 30. The longline first passes through a pair of horns 32 that are spaced a couple of inches apart. The horns strip the fish from the hooks. The horns 32 are conventional, and in systems not employing the unwinder of the present invention, are mounted on the intake side of the hauler-coiler. The longline thereafter traverses an entry roller 34 that is mounted for rotation about a generally horizontal axis that lies in a plane that is otherwise orthogonal to the longitudinal axis of the longline 18. The entry roller 34 is situated at a sufficient distance above the deck 16 of the fishing boat such that the longline 18, after traversing the roller 34, is oriented axially relative to the cylinders 40 and 42. The longline 18 is preferably drawn along a generally horizontal path through the unwinder.

The longline then passes between a pair of cleaning brushes 36 and 38 that are mounted for rotation about parallel axes on opposite sides of the path of the longline 18. The brushes are cylindrical and have radial bristles. The ends of the radial bristles of one of the brushes 36 lie adjacent the ends of the bristles of the other brush 38 along the path of the longline 18. The bristles serve to clean any remaining bait or debris from the hooks as the longline and gangions are drawn past the bristles. The brushes are allowed to rotate freely, thus distributing the wear of hook cleaning over the entire circumferential surface of the brushes. This arrangement of brushes, which is new to the art, is far superior to the practice in the prior art of placing two stationary, rectangular or disk-shaped brushes adjacent each other. Prior art rectangular or disk-shaped brushes must be replaced periodically or moved upwardly or downwardly relative to the longline path because of the wear of the hooks passing a single location of the brush. The rotatable brushes 36 and 38 positioned in accordance with the present invention virtually eliminate this problem and reduce brush maintenance to a minimum because every bristle can be used.

After the longline 18 passes through the cleaning brushes 36 and 38, it traverses a pair of hollow cylinders 40 and 42, which comprise the unwinder 14. Each of the cylinders 40 and 42 carry on their interior periphery a plurality of magnets that are arranged so that their magnetic field extends along paths oriented generally parallel to the path of the longline 18. The unwinding cylinders 40 and 42 each carry a ring gear 44 and 46, respectively, which in turn intermesh with spur gears 48 and 50. The spur gears 48 and 50 are directly coupled to the hydraulic motors 52 and 54 which rotate the cylinders 40 and 42 in opposite directions. The magnets carried by the first cylinder 40 are about twice as long as those carried by the second cylinder 42 for reasons that will become more apparent. Cylinder 40 serves as the wrapping station referenced above, while cylinder 42 serves as the unwrapping station. After the unwinder unwraps the gangion 24 from the longline 18, it exits from the unwinder 14 via an exit chute 56 and then enters the hauler-coiler 12 (FIG. 1).

To better understand the operation of the gangion unwinder of the present invention, refer conjunctively to FIGS. 2 and 3. Referring first to FIG. 3A, a longline 18 is illustrated with a gangion wrapped about the longline in a right-hand direction, that is, clockwise viewing the longline along its longitudinal axis from right to left. While the number of turns that a gangion is wound about the longline will vary, it has been found that generally there is a natural frequency with which the gangion is wrapped about the longline. That is, the average length, L, of one pitch or wrap of the gangion can generally be calculated for any given longline and gangion combination. For example, a gangion having a length on the order of 10 inches (25 centimeters) will normally be wrapped up to about three times around the longline in either a right-hand or left-hand direction as shown in FIGS. 3A and 3B. Still referring to FIG. 3A, a longline carrying the gangion 24 first enters the cylinder 40 (FIG. 2), which is rotating in a clockwise direction when viewed along its axis from right to left. The clockwise direction of rotation is indicated in FIG. 3A by arrow 40'. It will be understood that even though the hook on the gangion 24 will be attracted to the magnets in the cylinder 40, because the gangion is wrapped about the longline in a clockwise direction, the gangion will not be wrapped further about the longline. However, as the gangion 24 enters the second cylinder 42 (FIG. 2), which is rotating in a counterclockwise direction as indicated in FIG. 3A by the arrow 42', the hook on the gangion 24 will be attracted to the magnet in the second cylinder 42 (FIG. 2) and rotated circumferentially in a counterclockwise direction about the longline 18. The length of the cylinder 42, and more properly, the magnetic field within the cylinder 42, as well as the rotational speed of the cylinder 42 relative to the linear speed of the longline 18 through the cylinder are chosen so as to rotate the hook on the gangion approximately three times (for a 10-inch gangion) as the gangion passes through the cylinder 42, thus completely unwrapping the gangion from the longline 18.

Figure 3B:
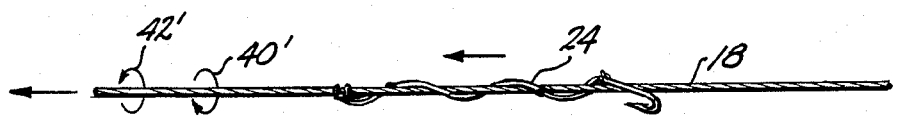

The extreme opposite case of the situation just discussed is illustrated in FIG. 3B. In FIG. 3B, the gangion is shown wrapped about the longline 18 prior to entering the unwinder in a left-hand or counterclockwise direction. When the gangion enters the first cylinder 40 rotating in the direction of arrow 40', the hook is attracted to the magnets in the cylinder 40. Because the cylinder 40 is rotating in a clockwise direction, the hook will be unwound from the longline 18. So that the gangions will not be rewound by the action of the magnets in the second cylinder 42, the length and speed of rotation of the first cylinder 40 is chosen so as to not only unwrap a gangion that is wound in a counterclockwise direction about the longline, but also to rewrap it again in its natural frequency of wrap, in a clockwise direction similar to the gangion pictured in FIG. 3A. Thus, as the gangion 24 exits first cylinder 40, it is rewrapped in a clockwise direction. Thereafter, it is again unwrapped by the coaction of the rotating magnets in the cylinder 42.

Figure 3C:
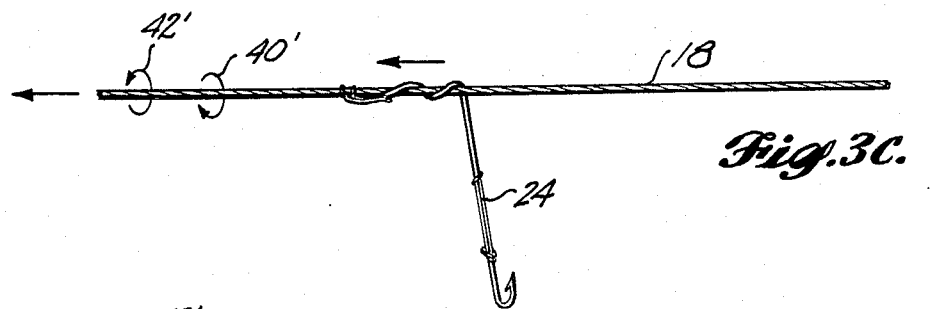
Figure 3D:
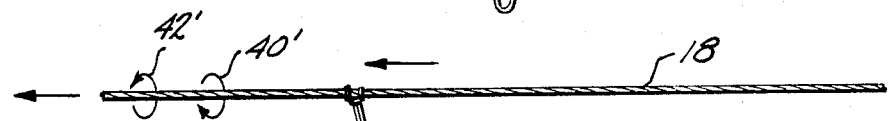

Similarly, as illustrated in FIG. 3C, if a gangion 24 is, for example, partially wrapped in a clockwise direction, the coaction of the rotating magnetic field in the first cylinder 40 will wrap the gangion in its natural frequency in a clockwise direction readying it for being unwrapped by the coaction of the magentic field in the second cylinder 42. Similarly, as illustrated in FIG. 3D, if a gangion is not wrapped at all as it enters the first cylinder 40, it again will be wrapped in the natural frequency of wrap in a clockwise direction (similar to the illustration in FIG. 3A). Once a gangion is completely wrapped, the magnetic field in the first cylinder 40, which in essence grasps the hook, will release the hook during each rotation so that the hook will slide along the inner surface of the cylinder. In this manner, the gangion will not be stretched, pulled or otherwise harmed as the magnetic field continues to rotate.

For gangions on the order of 12 inches long, and a longline hauling speed of approximately one foot per second, it has been found that magnetic fields in the first cylinder should be about eighteen inches long while the magnetic fields in the second cylinder should be about six inches long. With these dimensions and line speed, it has been found that rotational speeds for each of the cylinders 40 and 42 should be on the order of 800 rpm and 500 rpm respectively to provide a completely unwrapped gangion as it leaves the second cylinder 42. Of course, as will be readily recognized by one of ordinary skill, the rotational speed of the cylinders 40 and 42 must be related in some way to the speed at which the longline is being hauled. As will be understood in more detail by reference to the hydraulic schematic discussed below, one easy way to proportion the rotational speed of the unwinding cylinders to the speed of the longline is to power the hauler-coiler as well as the cylinders by hydraulic motors and to couple those hydraulic motors in series so that their speeds will be proportional.

Referring now to FIGS. 4, 5 and 6, the unwinder 14 is mounted on a frame 60 in turn affixed to a pedestal 62 that supports the unwinder above the deck of a fishing boat. The horns 32 are affixed to the forward or upstream end of the frame 60 at an angle with the upper ends of the horns 32 positioned upstream relative to the bottoms of the horns 32. A pair of parallel spacers 64 situated on each side and above the longline 18 extend rearwardly in a downstream direction and terminate at a location adjacent the upstream end of the cleaning brushes 36 and 38. The entry roller 34 is rotationally mounted below the longline path on a yoke 35 positioned on the frame below the path and immediately downstream of the horns 32. A pair of yokes 66 and 68 are mounted on the frame 60 on opposite sides of the longline path and extend upwardly to rotationally mount the cylindrical cleaning brushes 36 and 38. The brushes are preferably mounted so that the ends of the bristles overlap to maximize their cleaning efficiency.

The first cylinder 40 is rotationally mounted in a pair of bearings 70 and 72 that are affixed to the frame 60. The cylinder 40 carries balancing weight 74 that dynamically and statically balance the cylinder 40 for rotation at a relatively high speed. The second cylinder 42 is also rotationally mounted in a pair of bearings 76 and 78, also affixed to the frame 60. Cylinder 42 also carries balancing rings 80 for static and dynamic balancing. Both cylinders are mounted for rotation about their respective axes, which in turn are coincident.

The hydraulic motors 52 and 54 are mounted on the frame 60 below the cylinders 40 and 42 and are located so as to properly intermesh the first spur and ring gear set 44 and 48 driving the first cylinder 40 and the second spur and ring gear set 46 and 50 driving the second cylinder 42. The exit chute 56, which is stationary relative to the longline and cylinders is mounted on an upright bracket 82 affixed to the downstream end of the frame 60. As a gangion with an unwound hook exits the last cylinder 42, it tends to be thrown radially outwardly by centrifugal force. As that occurs, the hooks strikes the exit chute, dissipating its kinetic energy, thus allowing the hook to drop by gravity in an unwound state below the longline 18.

Figure 7:
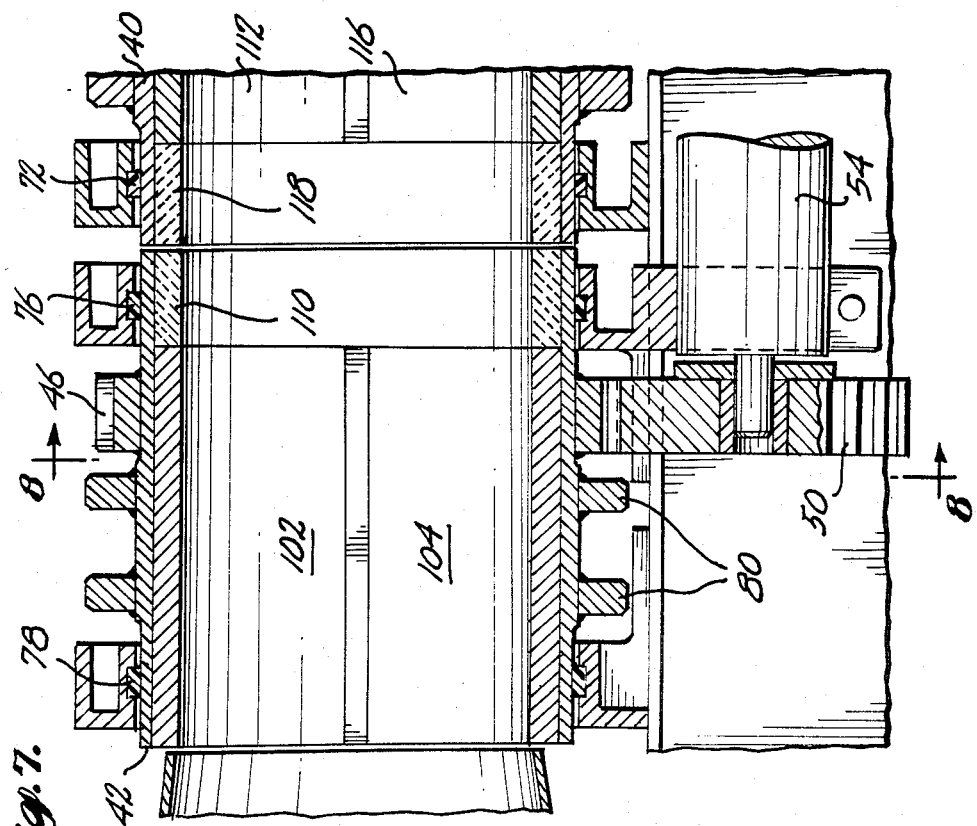
FIG. 7 is an enlarged, longitudinal sectional view of a portion of the gangion unwinder of the present invention.
Figure 8:
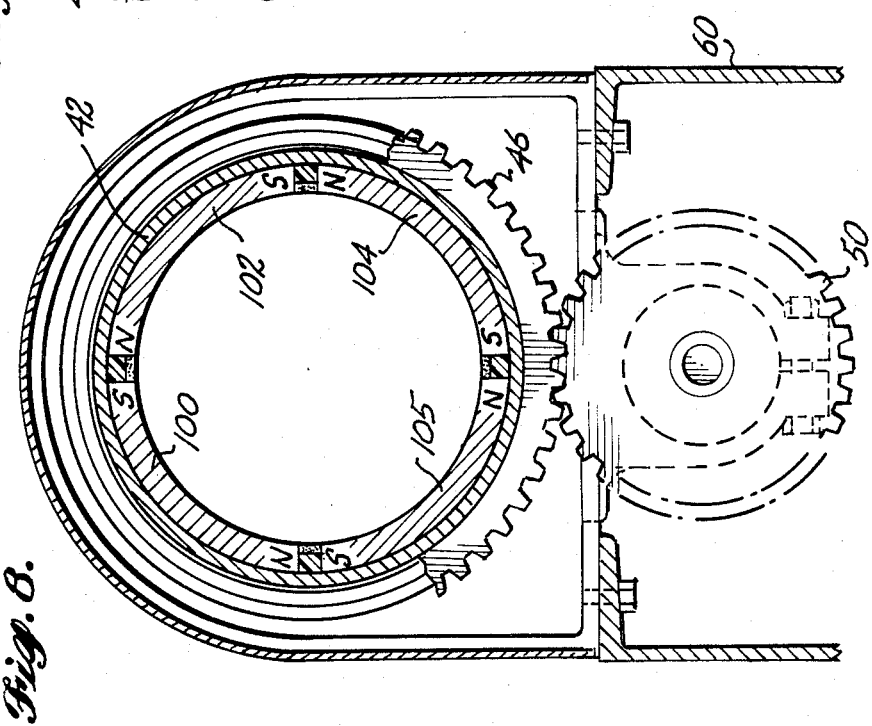
FIG. 8 is a cross-sectional view taken along a section line similar to 8—8 of FIG. 7.

Referring now to FIGS. 7 and 8, the manner in which the magnetic fields are preferably created within cylinders 40 and 42 is illustrated in additional detail. The unwinding cylinder 42 carries, in this embodiment, four arcuate magnets that are situated about the inner surface of the hollow cylinder 42. The magnets are oriented such that opposing north and south poles are situated 90° apart with the poles running in the longitudinal spaced or axial direction of the cylinder at locations spaced outwardly from the rotational axis of the cylinder. Thus, the four magnets create four magnetic fields having maximum intensities adjacent the inner periphery of the cylinder. As a hook enters the cylinder, it is attracted to one of these fields and is held by that field until, in the case of unwrapping cylinder 42, the gangion exits the cylinder when the gangion is completely unwound from the longline. In the first cylinder 40, for example, in the situation where a gangion is already wound in a clockwise direction, the hook is also attracted to one of the fields. However, the strength of the field is chosen such that the field will release the hook once the gangion is completely wound in a clockwise direction in a relatively taut manner. Thus, the magnetic fields serve as a means to controllably grasp the hooks in a manner sufficiently strong so as to wind or unwind the gangion as the case may be, but to release the hooks so as not to cause damage to the gangion when it is fully rewound in a clockwise direction by the first cylinder 40, or when the gangions exit either of the cylinders.

Referring to FIG. 7, the magnets 102 and 104 terminate short of the entry or upstream end of the cylinder 42. Space otherwise filled by the magnets is filled by an annular, nonmagnetic spacer 110. Similarly, the magnets 112 and 116 in the first cylinder 40 terminate short of the downstream or exit end of the cylinder 40. A similar annular spacer 118 is positioned to fill the remainder of the interior periphery of the first cylinder 40. The two spacers 110 and 118 thus provide a substantially continuous inner surface between the magnets in both cylinders. The magnets in the cylinders 40 and 42 are spaced from each other by the spacers 110 and 118 to prevent interference between the magnetic fields that are rotating in opposite direction and also to create a region containing no magnetic field so that the hook can easily be grasped and rotated in an opposite direction as the gangion and hook enter the unwinding cylinder 42.

While a currently preferred arrangement for the magnets has been disclosed, one of ordinary skill will understand that any of a variety of arrays or orientations would be satisfactory. For example, a checkerboard array of small magnets lining the interior of the cylinders would certainly be operable.

Figure 9:
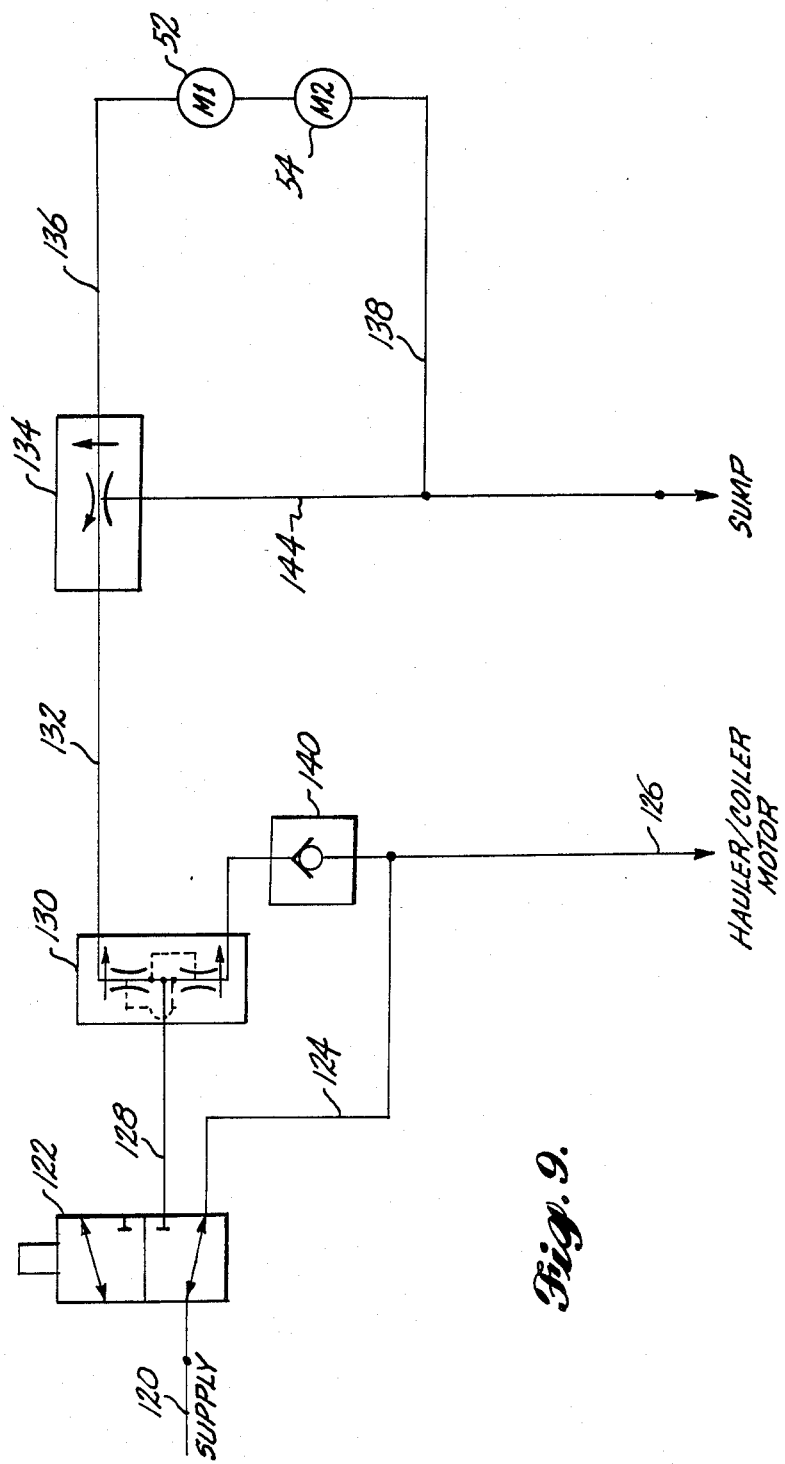
FIG. 9 is a schematic diagram of a preferred hydraulic circuit for controlling the gangion unwinder of the present invention.

Referring now to FIG. 9, a schematic of the hydraulic system for proportioning the speed of the cylinders 40 and 42 to the hauling line speed includes a supply hydraulic line 120, which feeds a three-way valve 122. A hydraulic fluid pump and a flow control valve (not shown) are positioned upstream of the three-way valve. In its first position, as illustrated, hydraulic fluid is fed to a bypass line 124, which routes hydraulic fluid via line 126 to the hydraulic motor for the hauler-coiler. In this position, no fluid is routed through the hydraulic motors of the unwinder, thus allowing independent operation of the hauler-coiler. When the valve 122 is moved to its second position, hydraulic fluid is routed through line 128 to a proportioning valve 130. The proportioning valve divides the flow according to a predetermined ratio and diverts a portion of the flow through line 132 to a second proportioning valve 134 and then to hydraulic feed line 136, which in turn feeds the hydraulic motor 52 that drives cylinder 40. Hydraulic motor 52 is coupled in series with the second hydraulic motor 54 that drives cylinder 42. Hydraulic fluid from these motors is returned to the sump via line 138. The remainder of the hydraulic fluid from the proportioning valve is run through a check valve 140 and into line 126, which in turn takes the flow to the hauler-coiler hydraulic motor. The second proportioning valve 134 will divert a portion of the flow to line 144. The second proportioning valve 134 can have various interchangeable inserts that can change or vary the proportion of fluid between lines 136 and 144, thus giving the operator of the system a degree of control over the speed of rotation of the motors 52 and 54 in relation to the line speed as dictated by the hydraulic motor on the hauler-coiler. Thus, the speed of the cylinders 40 and 42 relative to the line speed can be varied in the field to accommodate gangions of different length on different longlines.

One of ordinary skill, after reviewing the foregoing specification, will be able to effect various changes, substitutions of equivalents and make other alterations without departing from the broad concepts disclosed herein. For example, instead of rotating permanent magnets about the longline, as in the preferred embodiment, one of ordinary skill might position a plurality of elongated coils about the longline and then sequentially energize and de-energize those coils in a circumferential direction to, in essence, rotate a magnetic field about the longline without the necessity of moving parts. One of ordinary skill might also employ means for controllably grasping the hooks other than magnetic fields, for example, with brushes. It is therefore intended that the Letters Patent granted hereon be limited only by the definition contained in the appended claims and equivalents thereof.

The embodiments of the invention in which an exclusive property or privilege is claimed are defined as follows:

1. A method for unwinding a plurality of short lines from a longline, said short lines being affixed to and spaced along said longline, one end of said short lines being fixed to said longline, the other end of said short lines being free from said longline, the method comprising the steps of:

forwarding said longline along a relatively straight, unwinding path past a wrapping station and an upwrapping station, said unwrapping station being downstream from said wrapping station, controllably grasping the free end of a short line as it passes said wrapping station and wrapping said short line in a first direction about said long line regardless of the initial wrap orientation of the short line about said long line, and controllably grasping the free end of said short line at said unwrapping station and unwrapping said short line in a direction opposite to said first direction.

2. The method of claim 1 wherein said free end of each of said short lines has a magnetically permeable material affixed thereto, said free end of said short line being controllably grasped at said wrapping station by creating at least a first magnetic field having a relatively high field intensity at a location spaced radially from said relatively straight path, and wherein said free end of said short lines is grasped at said unwrapping station by creating at least a second magnetic field having a relatively high field intensity at a location downstream from said first magnetic field and spaced radially from said unwinding path.

3. The method of claim 2 wherein said first magnetic field extends a first predetermined distance along a longitudinal path oriented generally parallel to said straight path, and wherein said second magnetic field extends a second predetermined distance along a longitudinal path oriented generally parallel to said unwinding path.

4. The method of claim 3 wherein said short lines are wrapped in said first direction by rotating said first magnetic field in a first circumferential direction about said unwinding path at a first radial velocity, and wherein said short lines are wrapped in a direction opposite to said first direction at said unwrapping station by rotating said second magnetic field about said unwinding path in a circumferential direction opposite to said first circumferential direction.

5. The method of claim 4 wherein said longline is forwarded along said unwinding path at a first predetermined linear speed, said first magnetic field being rotated at a first rotational velocity proportional to said predetermined linear speed, said first rotational velocity and said first predetermined speed being selected to rewind substantially all of said short lines about said longline in said first circumferential direction as said longline moves along said unwinding path, and wherein said second magnetic field is rotated at a second rotational velocity proportional to said predetermined linear speed, said second rotational velocity and said second predetermined distance being selected to unwind said short lines from the longline as said longline moves along said unwinding path to thereby leave said short lines suspended substantially free of said longline.

6. An apparatus for unwinding a plurality of short lines from a longline wherein said short lines are affixed at spaced locations along said longline, one end of said short lines being fixed to said longline, the other end of said short lines being free from said longline, said apparatus comprising:

means for forwarding said longline along a relatively straight, unwinding path past a wrapping station and an unwrapping station, said unwrapping station being downstream from said wrapping station, means for controllably grasping the free end of a short line as it passes said wrapping station and means for wrapping said short line in a first direction about said longline, and means for controllably grasping the free end of a short line as it passes said unwrapping station and means for unwrapping said short line from said longline in a second direction opposite to said first direction.

7. The apparatus of claim 6 wherein said free end of said short line has a magnetically permeable material affixed thereto, said means for controllably grasping said longline at said wrapping station comprising means for providing a first magnetic field having a region of relatively high field intensity at a location spaced radially outwardly from said unwinding path, said means for controllably grasping said free end of said short line at said unwrapping station comprising means for providing a second magnetic field having a relatively high field intensity at a location positioned downstream from said first magnetic field and being spaced from said unwinding path.

8. The apparatus of claim 7 wherein said first magnetic field extends a first predetermined distance along a longitudinal path oriented generally parallel to said unwinding path, said second magnetic field extends a second predetermined distance along a longitudinal path oriented generally parallel to said unwinding path.

9. The apparatus of claim 8 wherein said means for wrapping said short line in the first direction at said wrapping station comprises means for rotating said first magnetic field in a first circumferential direction about said unwinding path, and wherein said means for unwrapping said short line from said longline comprises means for rotating said second magnetic field in a direction opposite to said first circumferential direction about said unwinding path.

10. The apparatus of claim 9 wherein said longline is forwarded along said unwinding path at a first predetermined linear speed, said first magnetic field being rotated about said unwinding path at a first rotational velocity proportional to said predetermined speed, said second magnetic field being rotated about said unwinding path at a second predetermined rotational velocity proportional to said predetermined linear speed.

11. The apparatus of claim 10 wherein said first rotational velocity and said first predetermined distance are selected so as to wind all the short lines about said longline in a first circumferential direction as said longline moves through said wrapping station, said second rotational velocity and said second predetermined speed being selected to unwind said short lines from said longline as said longline travels through said unwrapping station thereby leaving said short lines suspended relatively free from said longline.

12. The apparatus of claim 11 comprising a first cylindrical shell positioned at said wrapping station and a second cylindrical shell positioned at said unwrapping station, said first and second cylindrical shell being oriented substantially coaxially, said unwinding path extending in a direction parallel to the axes of and through said cylindrical shells, said means for providing said first magnetic field comprising at least one elongated permanent magnet mounted on said cylindrical shell, said means for providing a second magnetic field comprising at least one elongated permanent magnet mounted on said second cylindrical shell, said first and second cylindrical shells being mounted for rotation about said unwinding path.

* * * * *